Feb. 27, 1923.
O. A. COLBY
THERMOSTAT AND CONTROL SYSTEM
Filed Jan. 23, 1920
1,446,880
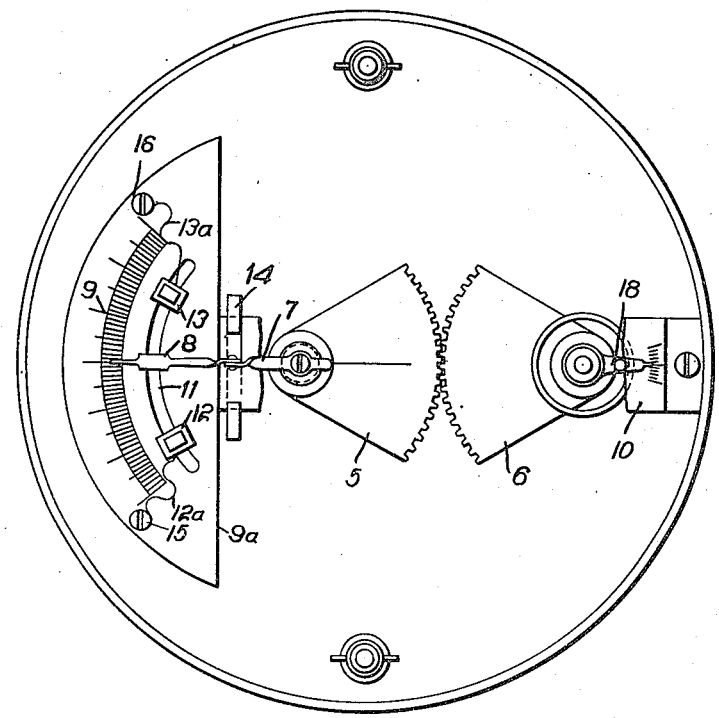
Fig.1.
Fig.2.
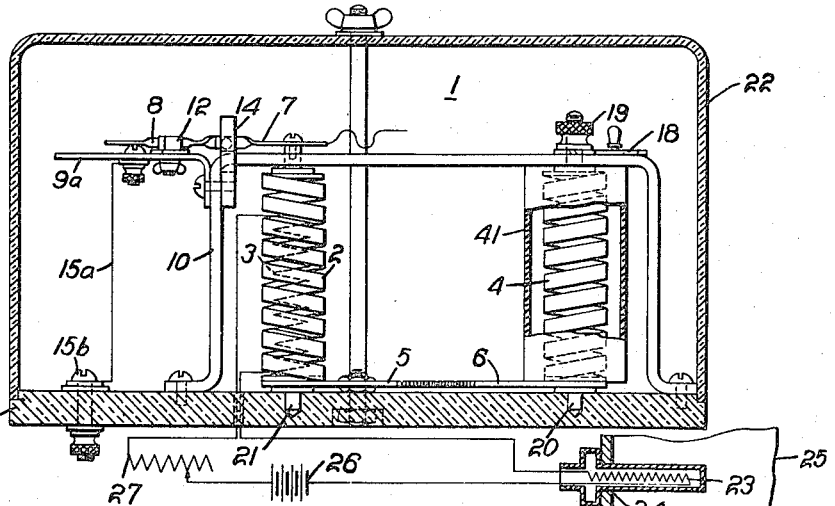
Fig.3.
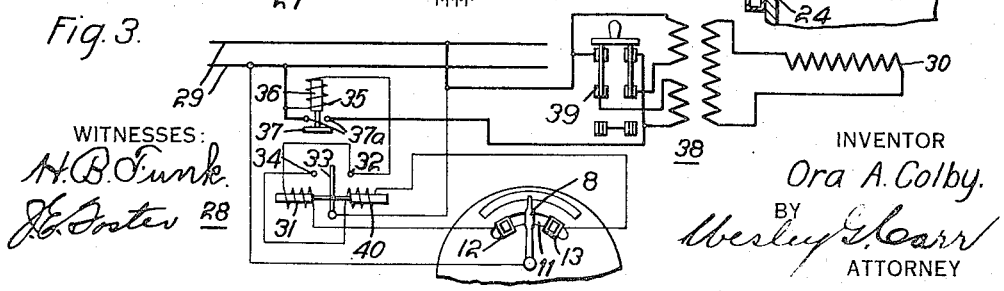
WITNESSES:
H. B. Funk
J. E. Foster
INVENTOR
Ora A. Colby.
BY
Wesley G. Carr
ATTORNEY Patented Feb. 27, 1923.

1,446,880

UNITED STATES PATENT OFFICE.

ORA A. COLBY, OF IRWIN, PENNSYLVANIA, ASSIGNOR TO WESTINGHOUSE ELECTRIC AND MANUFACTURING COMPANY, A CORPORATION OF PENNSYLVANIA.

THERMOSTAT AND CONTROL SYSTEM.

Application filed January 23, 1920. Serial No. 353,447.

*To all whom it may concern:*

Be it known that I, ORA A. COLBY, a citizen of the United States, and a resident of Irwin, in the county of Westmoreland and State of Pennsylvania, have invented a new and useful Improvement in Thermostat and Control Systems, of which the following is a specification.

My invention relates to thermostats and particularly to thermostats of the type that employ bi-metallic members.

An object of my invention is to provide a device whereby the temperature of a heat-storage device may be controlled between desirable limits.

Another object of my invention is to provide a device of the above indicated character that shall automatically compensate for changes in the temperature of the ambient air.

Another object of my invention is to provide a device of the above indicated character that shall indicate the temperature of the heat-storage device.

Another object of my invention is to provide a device of the above indicated character that shall be simple and compact in construction and reliable in its operation.

Heretofore, the energy developed in the heating of a plurality of thermocouples has been utilized for energizing a thermostat. In practicing my present invention I provide a helical bi-metallic member and a heating element therefor that shall be heated in accordance with the temperature of the heat-storage device that is heated from an independent source of energy. The bi-metallic member is adapted to actuate an indicating device for indicating the temperature of the heat-storage device. The indicating device is adapted, in co-operation with a plurality of stationary contact members, to complete circuits for controlling the heating of the heat-storage device. A permanent magnet is employed to effect a quick and positive engagement of the contact members.

To compensate for changes in temperature of the ambient air, I provide a second helical bi-metallic member that is coiled oppositely to the first bi-metallic member and is operatively connected thereto by means of gear segments. The compensating bi-metallic member is adapted to adjust the actuating bi-metallic member and may itself be adjusted, at one end thereof, which end is then locked to a supporting frame. The compensating bi-metallic member is so enclosed as to preclude the absorption of any heat that may radiate from the actuating bi-metallic member.

Figure 1 is a plan view of a thermostatic device embodying my invention; Fig. 2 is a side view partially in elevation and partially in section, of the device shown in Fig. 1; and Fig. 3 is a diagrammatic view of the temperature-control circuit embodying the device illustrated in Fig. 1.

A thermostat 1 comprises an actuating helical bi-metallic member 2, a heating element 3 therefor, a compensating helical bi-metallic member 4, and a plurality of gear segments 5 and 6 that operatively connect corresponding ends of the bi-metallic members 2 and 4. The bi-metallic member 2 is adapted to actuate a pointer 7 that is provided with a contact member 8 and is adapted to co-operate with a scale 9 to indicate values of temperature. A portion of the pointer 7 between its pivot and the contact member 8 is flexible in order to avoid objectionable shocks when movement of the contact member, in either direction, is suddenly interrupted by engagement with the stationary contact terminals to be hereinafter described. The plate $9^a$ that bears the scale 9 is secured to a supporting frame 10 and is provided with an insulating member 11 on which a plurality of movable contact members 12 and 13 are so adjustably mounted as to be engaged by the contact member 8 when in its extreme positions. In a modified form wherein the indication of temperature is not particularly desired, a permanent magnet 14 is employed to effect a quick and positive engagement between the contact member 8 and the contact members 12 and 13. The contact members 12 and 13 are connected, through flexible conductors $12^a$ and $13^a$ to terminal members 15 and 16, respectively, with which the scale plate $9^a$ is provided. The terminal members 15 and 16 are connected, through conductors $15^a$ to terminals $15^b$ that are mounted on a base 17 of the thermostat 1.

The compensating bi-metallic member 4 may be adjusted, as desired, by a lever arm 18 and then locked by a nut 19 to the supporting frame 10. The member 4 is supported on a bearing 20, and the actuating bi-metallic member 2 is supported on a bearing 21, in the base 17 of the thermostat 1. A casing 22 encloses the thermostat 1 to preclude the convection of heat therefrom. A resistor 23, that has a large temperature coefficient, is disposed in a housing 24 that is adapted to be introduced into a heat-storage device 25. A source of constant electromotive force 26 and a variable resistor 27 are connected in series with the resistor 23 and the heating element 3 that is associated with the actuating bi-metallic member 2. Since the active length of the resistor 27 is variable and the power of the source 26 of electromotive force may be unlimited, the thermostat may be made as accurate as desirable.

In the circuit that is illustrated in Fig. 3, the thermostat 1 is adapted to so actuate a relay 28 as to control the admittance of energy from a circuit 29 into the heat element 30 of the heat-storage device 25.

When the temperature of the heat-storage device 25 is to be controlled between two limits, the movable contact members 12 and 13 are disposed on the insulating member 11 at the temperature limits desired, as indicated on the scale 9, or they may be so disposed that the pointer registers zero at the temperature midway between the two limits.

While energy is admitted into the heating element 30 of the heat-storage device 25, engagement is maintained between the contact members 32 and 33 of the relay 28, thereby completing a circuit from one side of the circuit 29, through the winding 35 of a magnet switch 36, the contact members 32 and 33 of the relay 28, to the other side of the circuit 29. The winding 35 of the magnet switch 36, being thus maintained energized, so effects and maintains engagement of the bridging member 37 and contact members 37ª as to complete a circuit thereby, from one side of the circuit 29 through the contact members 37ª of the magnet switch 36, a transformer winding 38 and a switch 39 to the other side of the circuit 29. The switch 39 is adapted to connect the two parts of the primary winding of the transformer 38 in series or parallel relation with respect to each other for obtaining different values of current for energizing the heating element 30 of the heat-storage device.

When the bi-metallic member 2 is heated, in accordance with the temperature in the heat-storage device 25, the pointer 7 is turned thereby until the temperature in the heat-storage device attains the greater limit and engagement is effected between the contact member 8 on the pointer 7 and the stationary contact member 12. A circuit is then completed from one side of circuit 29 through the pointer 7, the contact members 8 and 12 and a winding 31 and contact members 32 and 33 of the relay 28, to the other side of the circuit 29. The winding 31, being thus energized, effects engagement of the contact members 33 and 34 of the relay 28. The disengagement of the contact members 32 and 33 opens the circuit that energized the winding 35 of the magnet switch 36. The magnet switch 36, being thus de-energized, its contact members 37 and 37ª become disengaged to open the circuit of the transformer 38 and thus preclude the energization of the heating element 30 of the heat-storage device 25.

When the temperature of the heat-storage device decreases, by reason of the disengagement of the contact members 37 and 37ª, the bi-metallic member 2 tends to so actuate the pointer 7 as to effect engagement of the contact members 8 and 13. A circuit is thereby completed from one side of the circuit 29, through the pointer 7, the contact members 8 and 13, the winding 40 and the contact members 33 and 34 of the relay 28, to the other side of the circuit 29. The winding 40, being thus energized, effects engagement of the contact members 32 and 33 of the relay 28, whereby a circuit is completed from one side of the circuit 29, through the winding 35 of the magnet switch 36 and the contact members 32 and 33 of the relay 28, to the other side of the circuit 29. The magnet switch 36, being thus re-energized, effects engagement of its contact members 37 and 37ª and a circuit is completed thereby from one side of the circuit 29, through the contact members 37 and 37ª, the transformer 38 and the switch 39, to the other side of the circuit 29. The transformer 38 being now energized, the heating element 30 of the heat-storage device 25 is traversed by the resulting current, and the heat-storage device 25 is, consequently, reheated.

Upon the occurrence of a change in the temperature of the ambient air, the bi-metallic member 2 tends to deflect the pointer 7 to the left. Since the compensating bi-metallic member 4 is also affected by the temperature of the ambient air, it tends to so actuate the bi-metallic member 2, through the gear segments 5 and 6, as to return the pointer 7 to its initial position, thus compensating for temperature changes in the ambient medium.

An enclosing receptacle 41 so surrounds the compensating bi-metallic member 4 as to preclude the absorption, thereby, of any heat that may be radiated from the heating element 3 and the heated bi-metallic member 2, and thus maintains the correct relation between the heated and the compensating bi-metallic members.

Although I have shown a preferred form of device embodying my invention, I do not wish to limit it thereto, as various modifications may be made in the structure thereof, without departing from the spirit and scope of the invention as set forth in the appended claims.

I claim as my invention:

1. In a thermostat for controlling the temperature of a heat-storage device, the combination with a helical bi-metallic member adapted to be heated in accordance with the temperature of the heat-storage device and a compensating helical bi-metallic member, of means for resetting the heated member, means for indicating the temperature of the heat-storage device, and means actuated through the indicating means for controlling the heating element of the storage device.

2. In a thermostat, the combination with a helical bi-metallic member adapted to be heated, of a compensating helical bi-metallic member operatively connected thereto and adapted to reset the heated member, adjusting means for the compensating member, and indicating means actuated by the heated member.

3. In a thermostat for controlling the temperature of a heat-storage device, the combination with a helical bi-metallic member, of a heating element thermally associated therewith and heated in accordance with the temperature of the heat-storage device, means for resetting the actuating helical member, means for indicating the temperature of the heat-storage device, and means controlled by the indicating means for controlling the heating element of the heat-storage device.

4. In a thermostat for controlling the temperature of a heat-storage device, the combination with a helical bi-metallic member and an indicating device actuated thereby, of a compensating helical bi-metallic member, a plurality of gear members for operatively connecting said members together and for compensating for changes in the temperature of the ambient air.

5. In a thermostat for controlling the temperature of a heat-storage device, the combination with a helical bi-metallic member and an indicating device actuated thereby, of means for heating the bi-metallic member in accordance with the temperature of the heat-storage device, and means controlled by the indicating device for controlling the heating of the heat-storage device.

6. In a thermostat for controlling the temperature of a heat-storage device, the combination with a helical bi-metallic membed and an indicating device actuated thereby, of a scale for the indicating device, a plurality of movably mounted contact members thereon, a contact member mounted on the indicating devices adapted to engage the movably-mounted contact members to complete a circuit for controlling the heating of the heat-storage device, and a casing for enclosing the thermostat.

7. In a thermostat for controlling the temperature of a heat-storage device, the combination with a bi-metallic member adapted to be heated in accordance with the temperature of the heat-storage device, of a compensating bi-metallic member operatively connected thereto for compensating for changes in the temperature of the ambient air.

8. In a thermostat for controlling the temperature of a heat-storage device, the combination with a bi-metallic member and an indicating device controlled thereby, of means for heating the bi-metallic member, a source of energy, means for controlling the heating means of the bi-metallic member in accordance with the temperature of the heat-storage device, and means for controlling the heating of the heat-storage device.

9. In a thermostat for controlling the temperature of a heat-storage device, the combination with a bi-metallic member adapted to be heated in accordance with the temperature of the heat-storage device, of an auxiliary bi-metallic member for automatically compensating for changes in the temperature of the ambient air.

10. In a thermostat for controlling the temperature of a heat-storage device, the combination with a bi-metallic member heated in accordance with the temperature of the heat-storage device, of a movable contact member actuated thereby, a plurality of stationary contact members, means for effecting a quick and positive engagement of the movable and the stationary contact members, and means for compensating for changes in the temperature of the ambient air.

11. In a thermostat for controlling the temperature of a heat-storage device, the combination with a bi-metallic member heated in accordance with the temperature of the heat-storage device, of a movable contact member actuated thereby, a plurality of stationary contact members, means for effecting a quick and positive engagement of the movable and the stationary contact members, and a compensating bi-metallic member to compensate for changes in the temperature of the ambient air.

In testimony whereof, I have hereunto subscribed my name this 31st day of December, 1919.

ORA A. COLBY.